F. S. CRAVEN.
SPEED INDICATOR.
APPLICATION FILED APR. 30, 1912.
1,052,321.
Patented Feb. 4, 1913.
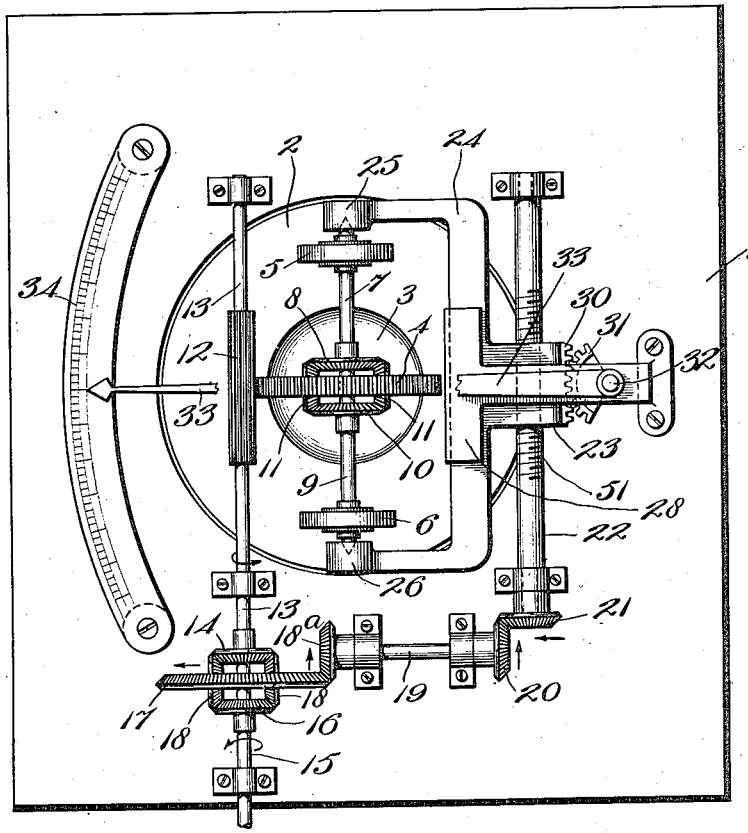
Fig. 1.
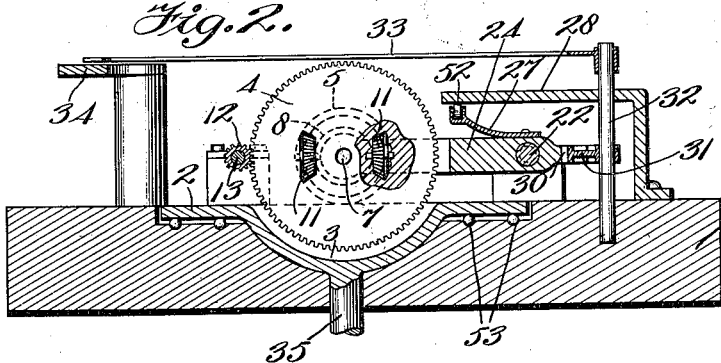
Fig. 2.
Fig. 3.

UNITED STATES PATENT OFFICE.

FRANCIS S. CRAVEN, OF THE UNITED STATES NAVY.

SPEED-INDICATOR.

1,052,321.

Specification of Letters Patent.

Patented Feb. 4, 1913.

Application filed April 30, 1912. Serial No. 694,194.

*To all whom it may concern:*

Be it known that I, FRANCIS S. CRAVEN, ensign, United States Navy, a citizen of the United States, at present attached to the U. S. S. *Utah*, have invented certain new and useful Improvements in Speed-Indicators; and I do hereby declare the following to be a full, clear, and exact description of the invention, such as will enable others skilled in the art to which it appertains to make and use the same.

This invention relates to speed indicators, and has for its object to produce a device of this nature capable of general use, which will be simple in construction, certain in action, and comparatively inexpensive to manufacture.

To these ends the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a plan view of a speed indicator made in accordance with my invention; Fig. 2 is an elevational sectional view of the parts shown in Fig. 1; and, Fig. 3 is a suitable form of reducing gears adapted to be used in connection with my invention.

1 indicates any suitable base upon which the mechanism is mounted; 2 a disk operated by a clock mechanism, not shown, but which makes a revolution in a predetermined time; 3 a sunken or cut out portion of the disk 2 to accommodate the totalizing wheel 4; 5 a friction wheel or disk adapted to contact with the disk 2; 6 another friction wheel or disk similar to the disk 5 and also adapted to contact with the face of the disk 2; 7 a shaft carrying the disk 5 and the gear 8; 9 a similar shaft carrying the disk 6 and a gear 10; 11 a pinion mounted in the totalizing wheel 4 and meshing with the gears 8 and 10, as shown; and 12 an elongated pinion with which the wheel 4 engages.

13 is a shaft carrying the pinion 12 mounted in bearings on the support 1, as shown, and carrying at one end a gear 14.

15 is a shaft whose revolutions it is desired to indicate: 16 a gear mounted on the shaft 15; 17 a totalizing wheel; and 18 a pinion meshing with the gears 14 and 16 mounted in the wheel 17.

18ª is a gear meshing with the wheel 17; 19 a shaft carrying said gear 18ª on which is mounted the bevel gear 20, meshing with the bevel gear 21, mounted on the screw-threaded shaft 22, passing through the nut-like extension 23 of the U-shaped frame 24, provided with the bearing 25 to accommodate the shaft 7, and the bearing 26 to accommodate the shaft 9. The said frame 24 is preferably further provided with a spring 27 adapted to take under the stationary plate 28 secured to the base 1, as best illustrated in Fig. 2.

The nut-like extension 23 is provided with rack teeth 30, meshing with the sector 31, mounted on the pivot 32, which also carries the pointer 33 playing over the scale 34, as shown.

35, Fig. 2, represents an extension from the plate 2 which may serve to suitably connect the said plate with the clock mechanism, not shown.

As will appear below, it will be sometimes desirable to substitute for the gears 14, 16 and 18ª, between the shafts 13 and 15, a reducing gear such as is shown in Fig. 3. The gear illustrated in this said figure consists of a pinion 40 carried by the shaft 15, meshing with the pinion 41 of larger diameter than the pinion 40, carried by the stud shaft 42, which also carries the pinion 43, which is smaller in diameter than the pinion 41, and which in turn meshes with the larger pinion 44 carried on the stud shaft 45, on which is mounted the smaller pinion 46 meshing with the larger gear 47 carried by the shaft 13.

The shafts 13 and 15 are adapted to move independently of each other, as best indicated in Fig. 3, and the stud shafts 42 and 45, as well as the pinions 41, 43, 44 and 46 are carried by the totalizing wheel 50 corresponding to the wheel 17, as shown.

The operation of my speed indicator is as follows: The disk 2 being driven by the minute arbor, for example, of a clock mechanism, not shown, and adapted to make say one revolution in about ten minutes, will drive the friction wheels or disks 5 and 6 in opposite directions, as will be clear from Fig. 1 of the drawings. If the said disks 5 and 6 contact with the driven disk 2 at points equally distant from the center of said disk 2, it is evident that they will turn their respective beveled gears 8 and 10 in opposite directions and at the same speed. The result will be that the bevel pinion 11 will move around its axis, without exerting any turning effect on the totalizing wheel 4 at all. On the other hand, should the disks 5 and 6 be moved across the face of the disk 2, so as to contact at points not equally distant from the center of the said disk 2, then it is evident that since the totalizing wheel 4 is loosely mounted on the shafts 7 and 9, it will be turned an angular distance equal to the difference in angular motion of the said bevel gears 8 and 10. This said difference of motion will of course, be transmitted to the pinion 12 and by the pinion 12 will be transmitted to the shaft 13 and the gear 14. On the other hand, should the totalizing wheel 4, disk 2, shaft 13, and gear 14, receive no motion at all, as would be the case when the parts are in the position illustrated in Fig. 1, then the shaft 15 being turned in the direction of the arrow, will turn the pinion 18 on the gear 14 as a track, and cause the totalizing wheel 17, loosely mounted on the shafts 13 and 15, to also turn in the direction of the arrow. The rotation of the wheel 17 will turn the gears 18a, 20 and 21, and cause the screw-threads 51 on the shaft 22 to move the member 23 and yoke 24 bodily across the face of the disk 2, and thereby cause the rotations of the disks 5 and 6 to be unequal, as stated above. The speeds of the said disks 5 and 6 now being of different values, and in opposite directions, the totalizing wheel 4 will turn the pinion 12 and the gear 14 in a direction opposite that of the gear 16, and thereby lessen the speed of the totalizing wheel 17. However, so long as the wheel 17 moves at all, the screw shaft 22 will continue to revolve and continue to move the yoke 24 and the disks 5 and 6 across the face of the disk 2, and thereby increase the difference in motion between the gears 8 and 10 and the speed of the totalizing wheel 4, which in turn will increase the speed of the gear 14, and lessen the speed of the totalizing wheel 17. A point will consequently soon be reached when the speed of the wheel 17 will be zero, and thereupon the radial movement of the friction wheels 5 and 6 will cease. As the yoke 24 bodily moves across the face of the disk 2, its rack teeth 30 will move the sector 31 around its pivot 32, and will therefore move the pointer 33 over the scale 34. The said pointer will continue to move so long as the disk 17 moves, but when the speed of the shaft 13 in the instance cited, equals the speed of the shaft 15, the wheel 17 will come to rest. This, of course, will cause the said pointer 33 to come to rest at that point on the scale 34, which indicates the speed of the shafts 13 and 15, although the shafts 13 and 15 are still revolving. The pointer will remain at the proper indication denoting the speed of the shaft 15 so long as the speed of the said shaft remains constant, but when this said speed increases or decreases, the pointer will move corresponding distances farther along the scale, or will move backward over the scale, as the case may be. Should the motion of the shaft 15 be reversed, its speed will first reach zero, when of course the speed of the shaft 13 will also reach zero, and the pointer will likewise indicate zero. As the speed of the shaft 15 next increases in the opposite direction, the rotations of the shaft 13 will likewise increase in a direction opposite to its original motion, and the pointer will indicate the proper speed on the other side of the scale 34. In practice, however, the speed of the shaft 15, which it is desired to measure, is very much greater than any convenient constant speed at which the shaft 13 can be run, and therefore, it is found necessary to employ a reducing gear between the shaft 15 and the shaft 13. There are many forms of suitable reducing gears for this purpose, and one of such forms is illustrated in Fig. 3. In this figure, motion of the shaft 15 may be transmitted to the wheel 50, which corresponds to the wheel 17, through the gears described above, and this motion may be reduced in any suitable fixed ratio so that although the rotations of the shaft 15 may be very high, yet they will be counteracted by the slower motions of the shaft 13, in the manner above disclosed.

The yoke 24 and the friction disks 5 and 6 are steadied in their movements by means of the spring 27 and roller 52, which takes under the plate 28, and the ball bearings 53 under the disk 2 serve to decrease friction.

It is obvious that those skilled in this art may vary the details of construction as well as the arrangement of parts without departing from the spirit of my invention, and therefore, I do not wish to be limited to the above disclosure, except as may be required by the claims.

What I claim is:—

1. In a speed indicator, the combination of a disk adapted to be driven at a predetermined speed; a plurality of oppositely driven disks controlled by said disk; a totalizing wheel driven by the difference in motion of said disks; a shaft the revolutions of which it is desired to indicate; connections between said totalizing wheel and said shaft comprising a second totalizing wheel; means for moving said oppositely driven disks over the face of said first mentioned disk; and connections between said second totalizing wheel and said moving means, substantially as described.

2. In a speed indicator, the combination of a disk adapted to be driven at a known speed; a shaft whose revolutions it is desired to indicate; friction disks contacting with said driven disk and movable radially thereof; connections between said friction disks and said shaft; gearing connections between said first named connections and said friction disks; and a pointer connected to be actuated by the radial movement of said friction disks to indicate at all times the speed of said shaft, substantially as described.

3. In a speed indicator, the combination of a disk adapted to be driven at a known speed; a shaft whose revolutions it is desired to indicate; friction disks contacting with said driven disk; means connecting said shaft with said friction disks comprising a screw-threaded rod for moving said friction disks radially of said driven disk; gearing connections between said friction disks and said connecting means; and a pointer connected to be actuated by the radial movement of said friction disks to indicate at all times the speed of said shaft, substantially as described.

4. In a speed indicator, the combination of a disk adapted to be driven at a constant speed; friction wheels movable on the face of said disk; a shaft whose speed of revolution it is desired to indicate; connections comprising a totalizing wheel between said friction wheels and said shaft; a movable yoke for supporting and moving said friction wheels; connections between said totalizing wheel and said yoke for moving the latter; and a pointer operated by the movement of said yoke for indicating the speed, substantially as described.

5. In a speed indicator, the combination of a disk adapted to be driven at a constant speed; friction wheels movable on the face of said disk; a shaft whose speed of revolution it is desired to indicate; connections comprising a pair of differential gears each having a totalizing wheel between said friction wheels and said shaft; a movable yoke for supporting and moving said friction wheels; connections between one of said totalizing wheels and said yoke for moving the latter; and a pointer operated by the movement of said yoke for indicating the speed, substantially as described.

6. In a speed indicator, the combination of a disk adapted to be rotated by a clock; a pair of friction wheels contacting with and driven in opposite directions by said disk; a differential gearing operated by said wheels; a pinion and shaft operated by said gearing; a second shaft whose rotations it is desired to indicate; a differential gearing between said first and second shafts; a yoke carrying said friction wheels and adapted to move the same across the face of said disk; connections between said second gearing and said yoke; and a pointer adapted to be moved by said yoke, substantially as described.

In testimony whereof, I affix my signature in presence of two witnesses.

FRANCIS S. CRAVEN.

Witnesses:
 GOOLD H. BULL,
 SAMUEL H. MIDDLETON.